Figure 1:
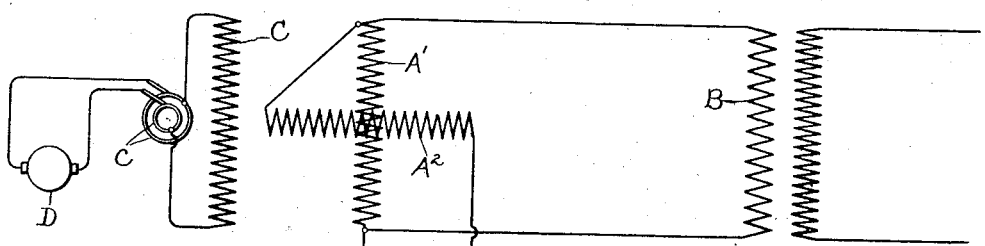

C. P. STEINMETZ.
SINGLE PHASE ALTERNATOR.
APPLICATION FILED JUNE 10, 1907.

917,181.

Patented Apr. 6, 1909.
2 SHEETS—SHEET 1.

WITNESSES:
Lester H. Fulmer
J. Ellis Glen

INVENTOR
CHARLES P. STEINMETZ.
BY Albert G. Davis
ATT'Y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SINGLE-PHASE ALTERNATOR.

No. 917,181.     Specification of Letters Patent.     Patented April 6, 1909.

Application filed June 10, 1907. Serial No. 378,084.

*To all whom it may concern:*

Be it known that I, CHARLES P. STEINMETZ, a citizen of the United States, residing at Schenectady, in the county of Schenectady and State of New York, have invented certain new and useful Improvements in Single-Phase Alternators, of which the following is a specification.

My invention relates to single-phase alternators, and its object is to provide means for equalizing the torque in such machines; and consequently reducing the mechanical stresses.

In a single-phase alternator the flow of energy is pulsating, varying at non-inductive load with double frequency between zero and twice the average value, and with a load of lagging or leading current varying between a small negative and a large positive value. This pulsation of energy results in pulsating stresses in the shaft and other parts of the machine, which become serious in large low-frequency high-speed alternators.

My invention consists in eliminating the pulsation of energy, or, in other words, equalizing the torque, by providing an energy-storing device, such as a condenser or reactive coil suitably connected to the armature winding of the machine, so that the device absorbs energy during the period when the alternator output is less than the average value, and returns this energy when the output exceeds the average value, thereby equalizing the load so that the alternator produces a uniform outflow of energy, a part of which is stored and returned by the energy storing device so that the load-circuit is supplied with the pulsating energy for the single-phase load.

If a non-inductive load-circuit is assumed, the maximum instantaneous value of energy in the load-circuit occurs at the maximum of the electromotive force wave, and its zero points are at the zero points of the electromotive force wave. The maximum input into the energy-storing device should occur at the zero point of the energy-wave for the load circuit, and consequently at the zero-point of the wave of the voltage impressed on the load circuit. If a reactive coil is employed for the energy-storing device, the maximum input is forty-five degrees behind the maximum of the electromotive force impressed on the coil. Consequently the maximum electromotive force impressed on the coil should be forty-five degrees ahead of the zero point of the electromotive force wave of the load-circuit,—or in other words, forty-five degrees behind the maximum of the electromotive force wave of the load-circuit. Consequently the electromotive force impressed on the reactive coil should be forty-five degrees behind the terminal-voltage of the alternator, if the load on the alternator is non-inductive. If the load is inductive, the maximum point on the energy-wave of the external circuit falls behind the maximum point of the electromotive force wave of the load-circuit by an angle equal to one-half the angle of lag of the load-circuit. Consequently, in order to balance the strains on the alternator for inductive load, the electromotive force impressed on the reactive coil should lag behind the terminal voltage of the alternator by an angle of forty-five degrees plus one-half the angle of lag of the load-circuit.

My invention, beside reducing the stress in the alternator, reduces the heating, as will be hereinafter explained, so that the machine can carry a greater load, and this increase in the capacity of the machine tends to compensate for the cost of the reactive coil or other energy-storing device. Furthermore my invention eliminates the pulsating armature reaction heretofore present in single-phase alternators which has produced heavy eddy currents and heating in the field magnet and has thereby limited the output. As will hereinafter appear my invention produces in the machine current distributions similar to those in a polyphase alternator with balanced load, so that the machine capacity is further increased.

My invention will best be understood by reference to the accompanying drawings, in which—

Figure 5:
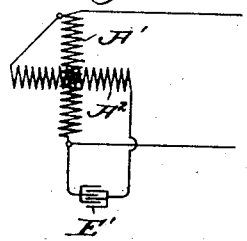
Figure 6:
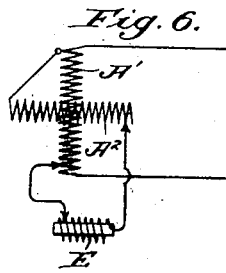
Figure 2:
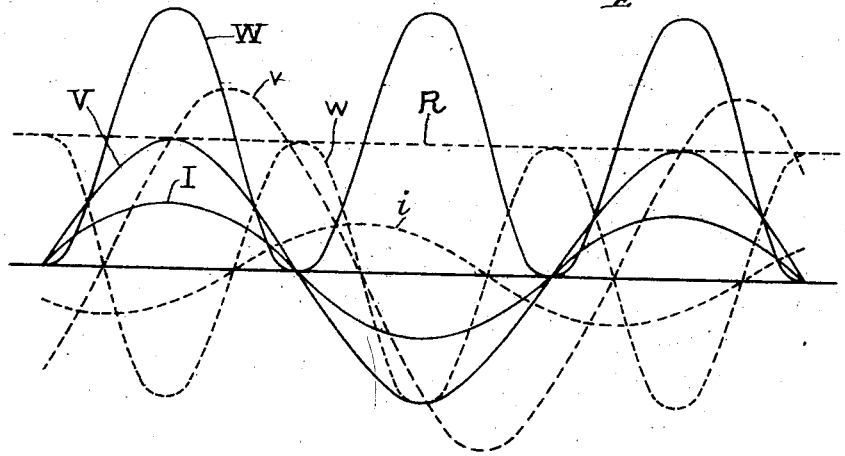
Figure 3:
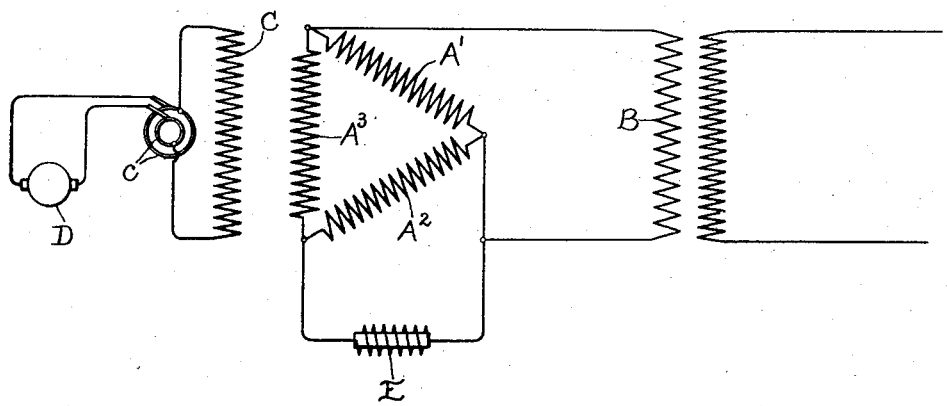
Figure 4:
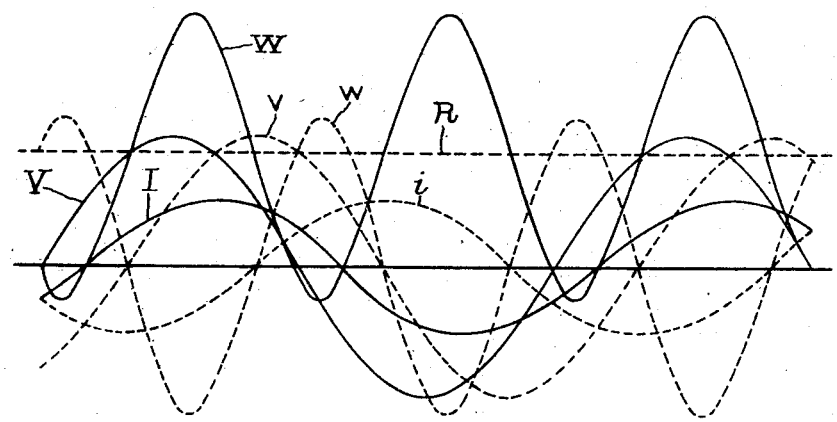

Figure 1 shows diagrammatically an alternator arranged in accordance with my invention; Fig. 2 is an explanatory diagram; Fig. 3 shows a modification for inductive load; Fig. 4 is an explanatory diagram of Fig. 3; Fig. 5 shows the armature winding alone with a different type of energy storing device; and Fig. 6 shows diagrammatically an arrangement whereby the connections between the armature winding of the alternator and the energy storing device may be adjusted for different loads and power-factors.

In Fig. 1, $A^1$ and $A^2$ represent two phases of the armature winding of an alternator supplying a single-phase load-circuit indicated by the step-up transformer B. Although the armature winding has a two-phase arrangement, the machine is a single-phase alternator in the sense that it is carrying a single-phase load, and it is in that sense that I use the term in this specification, since it is the character of the load, and not the arrangement of the winding which produces the stresses, in the elimination of which my invention consists. C represents the field winding of the alternator which is indicated diagrammatically as the rotary member, and is shown supplied through brushes and collector rings $c$ with current from an exciter D. While the load-circuit is connected across the phase $A^1$ only, a reactive coil E is connected across the two phases $A^1$ and $A^2$ in series. The reactive coil consequently has impressed upon it a voltage displaced forty-five degrees from the terminal-voltage of the alternator impressed on the load-circuit and equal to the terminal-voltage multiplied by $\sqrt{2}$.

Fig. 2 shows the relations of voltage, current, and watts in the several circuits. V represents the wave of the terminal-voltage of the phase $A^1$, or in other words, the voltage which is impressed on the load-circuit. I represents the current-wave in the load-circuit, which is assumed to be non-inductive. Consequently V and I are in phase. W represents the instantaneous watts of the load-circuit, and at any point is equal to the product of the corresponding values of the volts and the amperes. This energy-wave pulsates with a double frequency, its maximum point occurring at the maximum points of the voltage-wave V, and its zero points occurring at the zero points of the voltage-wave. $v$ represents the voltage-wave impressed on the terminals of the reactive coil E. This wave lags forty-five degrees behind the voltage wave W of the load circuit, and is equal to V $\sqrt{2}$. $i$ represents the current-wave in the reactive coil, which lags ninety degrees behind the voltage-wave $v$. The volt amperes in the reactive coil should equal the average load in volt-amperes in the load circuit, so, if I represents the average current in the load circuit, $i\,v$ should equal I V and therefore $$i = \frac{I}{\sqrt{2}}.$$

$w$ represents the curve of instantaneous watts or energy-wave in the reactive coil, which pulsates with double frequency between equal positive and negative maximum values. The maximum positive points of the wave are forty-five degrees behind the maximum points of the voltage wave $v$, and consequently ninety degrees behind the maximum points of the voltage-wave V, and are, therefore, opposite the zero points of the voltage-wave V and of the energy-wave W. The maximum negative points of the energy-wave $w$ are opposite the maximum points of the energy-wave W. The instantaneous output of the alternator at any instant is equal to the algebraic sum of the values of the energy-waves W and $w$ at that instant, and these instantaneous resultant values produce the resultant straight line R,—that is, the load on the alternator is uniform, and its amount is equal to the distance between the resultant line R and the axis; so that, although the energy-flow in the load-circuit is pulsating, the energy output is constant, the fluctuations being taken up by the absorption and restoration of energy by the reactive coil E.

The arrangement of Fig. 1, in addition to removing the stresses due to a pulsation of torque in the machine has the further advantage of increasing the capacity of the alternator. As has been explained heretofore, $$i = \frac{I}{\sqrt{2}}.$$

Since the current $i$ flows through both phases in series, the current in the phase $A^1$ is the vector sum of I and $i$, and since these two are displaced from each other by one hundred and thirty-five degrees, this vector sum is equal to $$\frac{I}{\sqrt{2}}.$$

In other words, the current in both phases is equal to $$\frac{I}{\sqrt{2}}.$$

Consequently, although the total $I^2 R$ is the same as though the circuit of the reactive coil E were opened, yet with the reactive coil this loss is equally distributed between the two phases, so that the phase $A^1$ can supply a greater output to the load-circuit without overheating than would be the case if the reactive coil E were disconnected. Furthermore since with the average load on the machine both phases are carrying the same current, $$\frac{I}{\sqrt{2}},$$

the current distribution in the machine is that of a two-phase alternator working on balanced load and the excessive heating which is produced in the field magnet of the usual single-phase alternator by eddy-currents induced by the pulsating armature reaction is largely eliminated.

In the foregoing discussion I have explained how to balance the torque in an alternator supplying a non-inductive load-circuit. Figs. 3 and 4 show a suitable arrangement for balancing the torque in an alternator supplying an inductive single-phase circuit. In these figures I have assumed an average current-lag of thirty degrees, which corresponds to a power-factor of 86.6%. As has been heretofore stated, the voltage impressed on the reactive coil should lag behind the voltage impressed on the load-circuit by an angle equal to forty-five degrees plus half the angle of lag. That is, in the present case, equal to sixty degrees. Consequently, a three-phase armature winding may be provided for the alternator, as shown in Fig. 3, the load-circuit being supplied from one phase $A^1$ and the choke-coil E from another, $A^2$. The instantaneous values of volts, amperes and watts are shown in Fig. 4. In this figure I is shown lagging behind V by thirty degrees. The energy-valve W fluctuates between a small negative value and a large positive value, which has its maximum fifteen degrees behind the maximum of V. $v$ is equal to V, and lags behind V by sixty degrees. Since $v$ is selected as equal to V, the reactive coil E should be so designed that $i$ is equal to I, if I represents the average load on the machine. $i$, as before, lags ninety degrees behind $v$, giving an energy-curve $w$, the maximum positive and negative values of which occur forty-five degrees behind and ahead of, respectively, the maximum value of $v$. Consequently the maximum negative value of $w$ is fifteen degrees behind the maximum value of V, and opposite the maximum value of W; while the maximum positive value of $w$ is opposite the maximum negative value of W. As before, the algebraic sums of W and $w$ give a straight line R, representing the total energy output of the machine. In place of a reactive coil, other kinds of energy storing devices may be employed,—for instance, Fig. 5 shows a condenser $E^1$ substituted for the reactive coil E of Fig. 1.

It will be obvious to those skilled in the art that in accordance with the principles set forth above the torque of a single-phase alternator may be balanced for any desired load and power-factor by properly designing the energy-storing device and properly connecting it to the armature winding. For the sake of simplicity in the drawings the reactive coil is shown permanently connected to fixed points on the armature winding. While such an arrangement can give exact balancing of torque for one load and power factor only, it will ordinarily be sufficiently exact when load and power factor do not vary excessively, but it will be obvious to those skilled in the art that if desired the connections of the reactive coil may be varied in any well known manner to maintain an exact balance for all loads and power factors. For instance, Fig. 6 shows an arrangement in which both the number of turns of the reactive coil and the amount and phase of the voltage impressed upon it are variable to suit varying conditions. While a reactive coil is the most convenient form of energy-storing device, other forms may be employed, if preferred, the connections of the device in each case being such that the maximum input occurs at the zero points of the energy wave of the load circuit. Furthermore, while I have described my invention particularly in connection with single-phase alternators used as generators, since it finds its most important application with generators, it will be understood that in its broader aspect my invention is equally applicable to synchronous motors supplied from a single-phase circuit where the character of the load is such as to render torque-balancing means desirable. It will further be understood that I have illustrated my invention diagrammatically for the sake of simplicity, and that in practice any well known forms of apparatus may be employed.

What I claim as new and desire to secure by Letters Patent of the United States, is,

1. In combination with a synchronous single-phase alternator and its external circuit, an energy-storing device electrically connected to the winding of said alternator and supplied periodically with energy therefrom, whereby strains in said alternator due to the pulsating energy flow between said alternator and its external circuit are approximately neutralized.

2. In combination with a synchronous single-phase alternator and its external circuit, an energy-storing device, and electrical connections between said device and the armature winding of said alternator adapted to produce a periodic interchange of energy between the alternator and device approximately in opposition to the energy-flow between said alternator and its external circuit.

3. In combination with a synchronous single-phase alternator and its load-circuit, an energy-storing device, and connections from the armature winding of said alternator to said device for impressing on said device a voltage displaced in phase from the terminal voltage of the alternator by an angle approximately equal to forty-five degrees plus one-half the average angle of lag in said load circuit.

4. In combination with a synchronous single-phase alternator and its load-circuit, a reactive winding, and connections from the armature winding of said alternator to said reactive winding for impressing on said reactive winding a voltage displaced in phase from the terminal voltage of said alternator by an angle approximately equal to forty-five degrees plus one-half the average angle of lag in said load-circuit.

5. In combination with a synchronous single-phase alternator and its load-circuit, an energy storing device, and connections from the armature winding of said alternator to said device for impressing on said device a voltage displaced in phase from the terminal voltage of the alternator by an angle approximately equal to forty-five degrees plus one-half the average angle of lag in said load-circuit, said device being designed to receive a volt-ampere input approximately equal to the average volt-ampere load on said alternator.

6. In combination with a synchronous single-phase alternator and its load-circuit, a reactive winding, and connections from the armature winding of said alternator to said reactive winding for impressing on said winding a voltage displaced in phase from the terminal voltage of said alternator by an angle approximately equal to forty-five degrees plus one-half the average angle of lag in said load-circuit, said reactive winding being designed to receive a volt-ampere input approximately equal to the average volt-ampere load on said alternator.

7. In combination, a synchronous alternator having a polyphase armature winding, a single-phase external circuit connected to one phase of said winding, and an energy-storing device connected to another phase of said winding.

8. In combination, a synchronous alternator having a polyphase armature winding, a single-phase external circuit connected to one phase of said winding, and a reactive winding connected to another phase of said winding.

9. In combination, a synchronous alternator having a polyphase armature winding, a single phase external circuit connected to one phase of said winding, and an energy-storing device connected to another phase of said winding, said device being designed to receive a volt-ampere input approximately equal to the average volt-ampere load in said circuit.

10. In combination, a synchronous alternator having a polyphase armature winding, a single-phase external circuit connected to one phase of said winding, and a reactive winding connected to another phase of said winding, said reactive winding being designed to receive a volt-ampere input approximately equal to the average volt-ampere load in said circuit.

In witness whereof, I have hereunto set my hand this 8th day of June, 1907.

CHARLES P. STEINMETZ.

Witnesses:
BENJAMIN B. HULL,
MARGARET E. WOOLLEY.